United States Patent
Endo et al.

(10) Patent No.: US 11,929,621 B2
(45) Date of Patent: Mar. 12, 2024

(54) POWER CONTROL APPARATUS, CONTROL METHOD FOR POWER CONTROL APPARATUS, AND DISTRIBUTED POWER GENERATING SYSTEM

(71) Applicant: GS Yuasa International Ltd., Kyoto (JP)

(72) Inventors: Hiroaki Endo, Kyoto (JP); Masao Yokoyama, Kyoto (JP); Shinichi Hongo, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 211 days.

(21) Appl. No.: 17/603,261

(22) PCT Filed: Apr. 17, 2020

(86) PCT No.: PCT/JP2020/016875
§ 371 (c)(1),
(2) Date: Oct. 12, 2021

(87) PCT Pub. No.: WO2020/218191
PCT Pub. Date: Oct. 29, 2020

(65) Prior Publication Data
US 2022/0200287 A1 Jun. 23, 2022

(30) Foreign Application Priority Data
Apr. 26, 2019 (JP) .................................. 2019-085131

(51) Int. Cl.
*H02J 3/38* (2006.01)
*H02J 3/00* (2006.01)
(Continued)

(52) U.S. Cl.
CPC .............. *H02J 3/381* (2013.01); *H02J 3/003* (2020.01); *H02J 3/004* (2020.01); *H02J 3/32* (2013.01);
(Continued)

(58) Field of Classification Search
CPC .. H02J 3/381; H02J 3/003; H02J 3/004; H02J 3/32; H02J 3/46; H02J 2300/24; H02M 7/68
See application file for complete search history.

(56) References Cited

U.S. PATENT DOCUMENTS

| | | | |
|---|---|---|---|
| 9,935,465 B2 * | 4/2018 | Inoue ........................ | H02J 3/40 |
| 2013/0088900 A1 * | 4/2013 | Park ........................ | H02J 9/062 |
| | | | 363/71 |
| 2019/0181644 A1 * | 6/2019 | Chae ........................ | H02J 3/466 |

FOREIGN PATENT DOCUMENTS

| | | |
|---|---|---|
| JP | 4765162 B2 | 9/2011 |
| JP | 2012-100504 A | 5/2012 |

(Continued)

OTHER PUBLICATIONS

International Search Report (ISR) (PCT Form PCT/ISA/210), in PCT/JP2020/016875, dated Jun. 23, 2020.

*Primary Examiner* — Carlos Amaya
(74) *Attorney, Agent, or Firm* — MCGINN I.P. LAW GROUP, PLLC

(57) ABSTRACT

A power control apparatus for a distributed power supply interconnected with a power system includes: a conversion circuit that performs reverse conversion of converting power supplied from the distributed power supply from direct current to alternating current and outputting the converted power; and a control device that controls the conversion circuit. The control device changes a target value of received power at a power reception point of the power system on the basis of a predicted value of a power generation amount of (Continued)

the distributed power supply and a predicted value of power consumption of a demand facility, and controls an output of the conversion circuit such that the received power at the power reception point becomes a target value.

20 Claims, 10 Drawing Sheets

(51) Int. Cl.
  *H02J 3/32* (2006.01)
  *H02J 3/46* (2006.01)
  *H02M 7/68* (2006.01)

(52) U.S. Cl.
  CPC ............. *H02J 3/46* (2013.01); *H02J 2300/24* (2020.01); *H02M 7/68* (2013.01)

(56) References Cited

FOREIGN PATENT DOCUMENTS

| | | |
|---|---|---|
| JP | 2012-222908 A | 11/2012 |
| JP | 2014-180130 A | 9/2014 |
| JP | 2017-017792 A | 1/2017 |
| JP | 2017-134494 A | 8/2017 |
| JP | 2018-166379 A | 10/2018 |
| JP | 2018-182847 A | 11/2018 |
| WO | WO 2014/141499 A1 | 9/2014 |

\* cited by examiner

POWER CONTROL APPARATUS, CONTROL METHOD FOR POWER CONTROL APPARATUS, AND DISTRIBUTED POWER GENERATING SYSTEM

TECHNICAL FIELD

One aspect of the present invention relates to a power control apparatus for a distributed power supply that communicates with a power system, a control method for the power control apparatus, and a distributed power generating system.

BACKGROUND ART

From the viewpoint of a reduction in dependence on fossil fuels and environmental problems, the introduction of distributed power supplies typified by a photovoltaic system (PV system) has been advanced. The PV system converts power generated by a photovoltaic panel from direct current (DC) to alternating current (AC) by using an inverter circuit of a power control apparatus and outputs the converted power.

In recent years, an energy management system (EMS) has attracted attention. The EMS is a system that monitors and optimizes the use state of energy. One of the EMS technologies is demand response (DR). The demand response is a demand adjustment of electricity. The demand for electricity is reduced by lowering DR, and the demand for electricity is increased by raising DR, thereby achieving a supply and demand balance of electricity. Patent Document 1 below discloses that power consumption of a consumer is controlled using a home energy management system (HEMS) controller (determination apparatus 100) in response to a DR command issued from a power company.

Patent Document 2 below discloses a technique for controlling a second power conversion means such that received power detected by a received power detection means does not fall below predetermined power at the time of outputting both generated power of a distributed power supply and power from an energy storage means in an energy storage type photovoltaic system. Thereby, the power from the energy storage means is prevented from flowing back to a power system.

PRIOR ART DOCUMENTS

Patent Documents

Patent Document 1: JP-A-2017-134494
Patent Document 2: Japanese Patent No. 4765162

SUMMARY OF THE INVENTION

Problems to be Solved by the Invention

In order to efficiently operate power, there is an increasing need to apply the EMS technology to a distributed power supply system. When a dedicated EMS controller is installed in the distributed power supply system, a system configuration becomes complicated, and a high cost is required.

Means for Solving the Problems

A power control apparatus for a distributed power supply interconnected with a power system according to one aspect of the present invention includes: a conversion circuit that performs reverse conversion of converting power supplied from the distributed power supply from DC to AC and outputting the converted power; and a control device that controls the conversion circuit. The control device changes a target value of received power at a power reception point of the power system on the basis of a predicted value of a power generation amount of the distributed power supply and a predicted value of power consumption of a demand facility, and controls an output of the conversion circuit such that the received power at the power reception point becomes a target value.

This technique can be applied to a control method for the power control apparatus and a distributed power generating system.

Advantages of the Invention

With this technology, it is possible to realize EMS technology without using a dedicated EMS controller.

MODE FOR CARRYING OUT THE INVENTION

Figure 1:
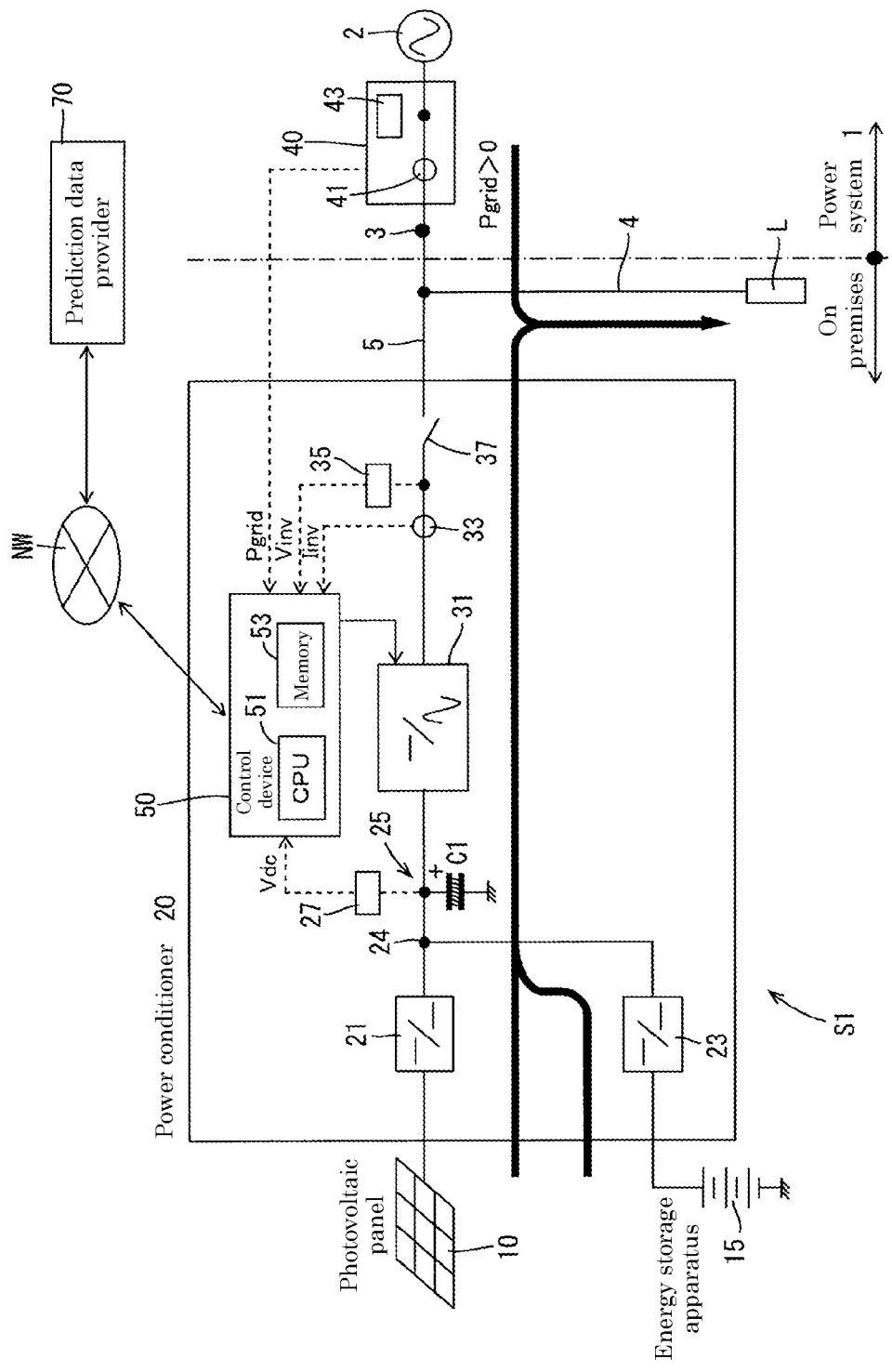
FIG. 1 is a block diagram of a photovoltaic system.

The application of EMS technology to a distributed power supply system has been an issue in order to operate power efficiently. There has been a problem that when a dedicated EMS controller is installed, a system configuration becomes complicated, and a high cost is required. The inventors have considered using a power control apparatus to realize the function of the EMS controller and eliminating the EMS controller. The inventors have achieved an electricity supply and demand adjustment function in the power control apparatus by improving a technique for controlling a target value of received power (e.g., the technique disclosed in Patent Document 2).

A power control apparatus for a distributed power supply interconnected with a power system includes: a conversion circuit that performs reverse conversion of converting power supplied from the distributed power supply from DC to AC and outputting the converted power; and a control device that controls the conversion circuit. The control device changes a target value of received power at a power reception point of the power system on the basis of a predicted value of a power generation amount of the distributed power supply and a predicted value of power consumption of a demand facility, and controls an output of the conversion circuit such that the received power at the power reception point becomes a target value.

The demand facility is preferably an on-premise load, the power consumption of which is predictable (easily predictable).

By changing the target value of the received power, the power flow from the power system to the power reception point can be adjusted. Hence it is possible to adjust the demand for electricity and efficiently operate power. Since the power control apparatus performs the supply and demand prediction and demand adjustment of electricity, a dedicated EMS controller is unnecessary, which is effective for cost reduction of the system.

The conversion circuit may be a bidirectional conversion circuit that selectively performs reverse conversion of converting power supplied from the distributed power supply from DC to AC and outputting the converted power or forward conversion of converting power supplied from the power system from AC to DC and outputting the converted power. To the conversion circuit, an energy storage apparatus may be connected in parallel with the distributed power supply. The control device may change a target value of the received power to a value larger than the predicted value of the power consumption when the predicted value of the power generation amount of the distributed power supply is larger than the predicted value of the power consumption, the control device causing the conversion circuit to perform a forward conversion operation to charge the energy storage apparatus.

When the predicted value of the power generation amount of the distributed power supply is larger than the predicted value of the power consumption of the on-premise load, the supply of electricity exceeds the demand, and the supply is excessive. In such a case, the energy storage apparatus is charged to increase the demand for electricity, so that a supply and demand balance of electricity can be achieved.

The conversion circuit may be a bidirectional conversion circuit that selectively performs reverse conversion of converting power supplied from the distributed power supply from DC to AC and outputting the converted power or forward conversion of converting power supplied from the power system from AC to DC and outputting the converted power. To the conversion circuit, an energy storage apparatus may be connected in parallel with the distributed power supply. The control device may change a target value of the received power to a value smaller than the predicted value of the power consumption when the predicted value of the power consumption is larger than the predicted value of the power generation amount of the distributed power supply, the control device causing the conversion circuit to perform a reverse conversion operation to discharge the energy storage apparatus.

When the predicted value of the power consumption of the on-premise load is larger than the predicted value of the power generation amount of the distributed power supply, the demand for electricity exceeds the supply, and the demand is excessive. In such a case, the energy storage apparatus is discharged to supply electricity to the power system, so that the supply and demand balance can be achieved.

First Embodiment

1. Description of Photovoltaic System S1

FIG. 1 is a block diagram of a photovoltaic system S1.

The photovoltaic system S1 includes a photovoltaic panel 10, an energy storage apparatus 15, and a power conditioner 20. The photovoltaic panel 10 is an example of a distributed power supply, and the power conditioner 20 is an example of a power control apparatus. The photovoltaic system S1 is an example of a distributed power generating system.

The photovoltaic system S1 is a system not having a dedicated EMS controller. The dedicated EMS controller is a dedicated controller for performing EMS control and is a separate apparatus from the power conditioner. The dedicated EMS controller is, for example, an apparatus that monitors the state of the distributed power supply system and controls the output of the distributed power supply system on the basis of the supply and demand balance of electricity to adjust the demand for electricity.

The power conditioner 20 includes a first converter circuit 21, a second converter circuit 23, a DC link 25, a bidirectional inverter circuit 31, a relay 37, a control device 50, a DC voltage detector 27, an output current detector 33, and an output voltage detector 35.

The photovoltaic panel 10 is connected to the first converter circuit 21. The first converter circuit 21 is a DC/DC converter and boosts and outputs an output voltage (DC) of the photovoltaic panel 10. The first converter circuit 21 may be a chopper.

The energy storage apparatus 15 is connected to the second converter circuit 23. The energy storage apparatus 15 is, for example, a secondary battery. The second converter circuit 23 is a bidirectional DC/DC converter that discharges and charges the energy storage apparatus 15. The second converter circuit 23 may be a bidirectional chopper.

The photovoltaic panel 10 and the energy storage apparatus 15 are connected in parallel to the DC link 25 via the first converter circuit 21 and the second converter circuit 23.

The DC link 25 is located between a connection point 24 of the converter circuits and the bidirectional inverter circuit 31. The DC link 25 is provided with an electrolytic capacitor C1. The electrolytic capacitor C1 is provided to stabilize a voltage Vdc of the DC link 25.

The DC voltage detector 27 detects the voltage Vdc of the DC link 25. The voltage Vdc of the DC link 25 detected by the DC voltage detector 27 is input to the control device 50.

The bidirectional inverter circuit 31 is a bidirectional conversion circuit that selectively performs reverse conversion (inversion) of converting DC to AC and forward conversion (conversion) of converting AC to DC. The bidirectional inverter circuit 31 is connected to the DC link 25, converts DC power input from the DC link 25 to AC power, and outputs the AC power at the time of the reverse conversion operation. Specifically, power corresponding to a voltage increased from a reference value in the DC link 25 by the power generation of the photovoltaic panel 10 is input to the bidirectional inverter circuit 31. Therefore, the power corresponding to the voltage increased from the reference value is converted from DC to AC and output from the bidirectional inverter circuit 31.

The energy storage apparatus 15 can store the surplus power of the photovoltaic panel 10 via the second converter circuit 23. When a power generation amount PG of the photovoltaic panel 10 is insufficient, the energy storage apparatus 15 can compensate for the shortage of the power generation amount PG by discharging via the second converter circuit 23.

The bidirectional inverter circuit 31 is connected to the power system 1 using a system power supply 2 as an AC power supply via a relay 37. The power system may be of a power company or may be an independent power system achieved by a self-sustained operation output of a large power conditioner.

The relay 37 is installed for interconnection with the power system 1. By closing the relay 37, the photovoltaic system S1 can be interconnected to the power system 1.

The output current detector 33 detects an output current Iinv of the bidirectional inverter circuit 31. The output voltage detector 35 is located on the output side of the bidirectional inverter circuit 31 and detects an output voltage Vinv of the bidirectional inverter circuit 31.

The output current Iinv of the bidirectional inverter circuit 31 detected by the output current detector 33 and the output voltage Vinv of the bidirectional inverter circuit 31 detected by the output voltage detector 35 are input to the control device 50. The control device 50 calculates output power (active power) Pinv of the bidirectional inverter circuit 31 on the basis of the output current Iinv and the output voltage Vinv of the bidirectional inverter circuit 31. The output power Pinv is "positive" at the time of reverse conversion and "negative" at the time of forward conversion.

An on-premise load L as a demand facility is connected to a power line 5 connecting the bidirectional inverter circuit 31 and the power system 1 via a branch line 4. Power can be supplied from both the power conditioner 20 and the power system 1 to the on-premise load L.

A power reception point 3 is a power supply point by the power system 1 and is located in the vicinity of the boundary between the power system 1 and the premises provided with the on-premise load L that is a demand facility, as illustrated in FIG. 1. The power reception point 3 (power reception line) is located between a point at which the on-premise load L or the branch line 4 is connected to the power line 5 and the system power supply 2.

The power system 1 is provided with an external measuring instrument 40, such as an external transducer, as a meter for detecting power at the power reception point 3.

The external measuring instrument 40 includes a received current detector 41 and a system voltage detector 43. The external measuring instrument 40 is installed corresponding to the power reception point 3, and the received current detector 41 detects the received current Igrid at the power reception point 3. The system voltage detector 43 detects a system voltage Vgrid of the power system 1.

The external measuring instrument 40 calculates received power (active power) Pgrid on the basis of the received current Igrid and the system voltage Vgrid. The received power Pgrid detected by the external measuring instrument 40 is input to the control device 50. The received power Pgrid can be used to determine the state of power flow (hereinafter simply referred to as flow.). The external measuring instrument 40 is a measuring instrument that measures the received power Pgrid at the power reception point 3.

Figure 2:
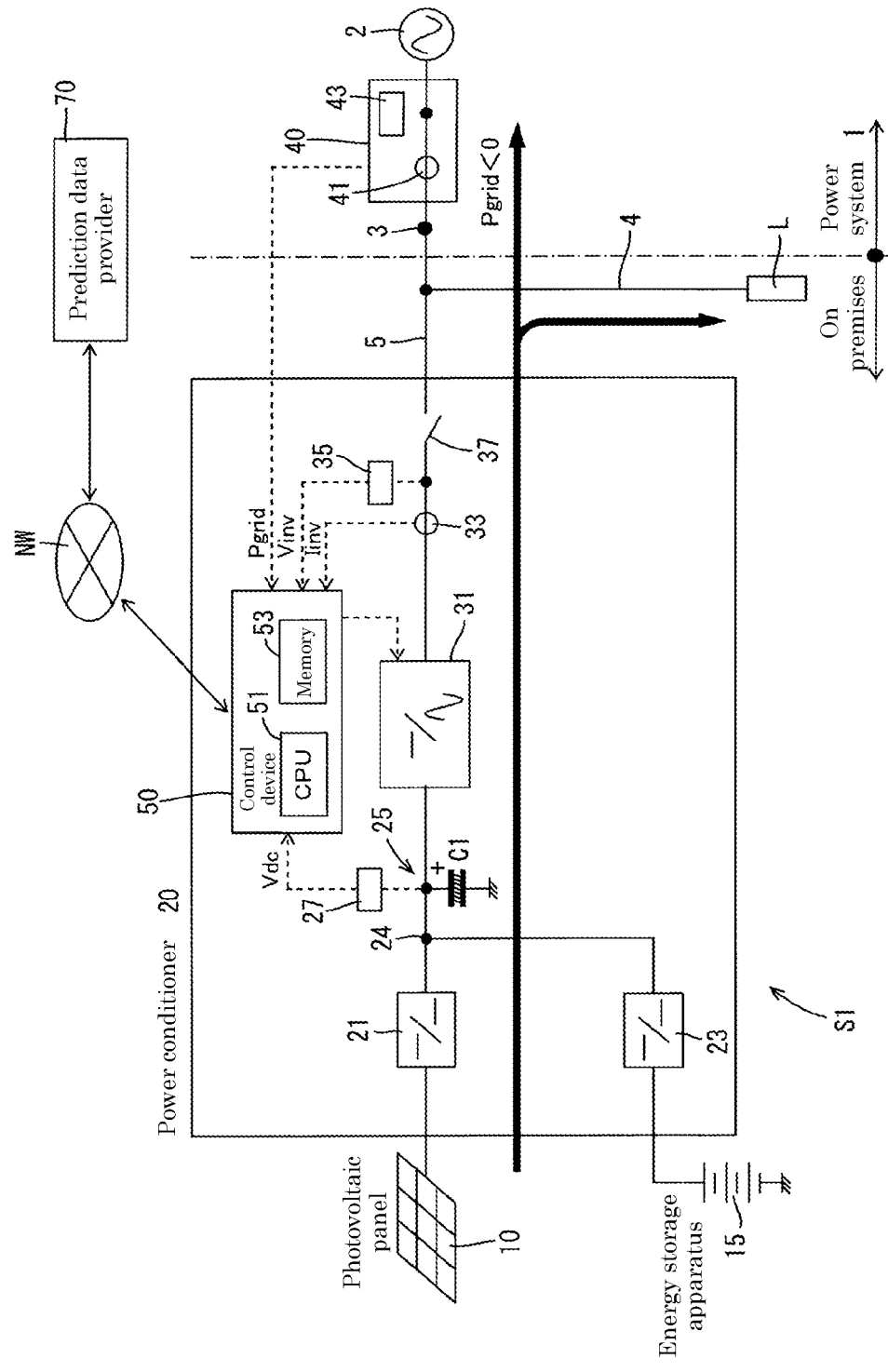
FIG. 2 is a block diagram of a photovoltaic system.

In the received power Pgrid, a forward flow (FIG. 1: a flow of electricity from the power system toward the inside of the premise) is set to "positive", and a reverse flow (FIG. 2: a power flow of electricity from the inside of the premises to the power system) is set to "negative".

The control device 50 includes a central processing unit (CPU) 51 and a memory 53. The memory 53 stores a program for predicting power supply and demand and a program for changing a target value of the received power Pgrid at the power reception point 3.

The control device 50 can control the switching between the forward conversion operation and the reverse conversion operation by giving a command to the bidirectional inverter circuit 31 and can control the output of the bidirectional inverter circuit 31, that is, the output power Pinv. The output power Pinv can be controlled by adjusting the output current Iinv.

The control device 50 can control the connection/non-connection of the photovoltaic panel 10 to the DC link 25 by turning on and off the first converter circuit 21 and can control connection/non-connection of the energy storage apparatus 15 to the DC link 25 by turning on and off the second converter circuit 23. The control device 50 can control the switching between the charge and discharge of the energy storage apparatus 15 via the second converter circuit 23 and can control the charge current and the discharge current of the energy storage apparatus 15 via the second converter circuit 23.

2. Prediction of Supply and Demand for Power

Figure 3:
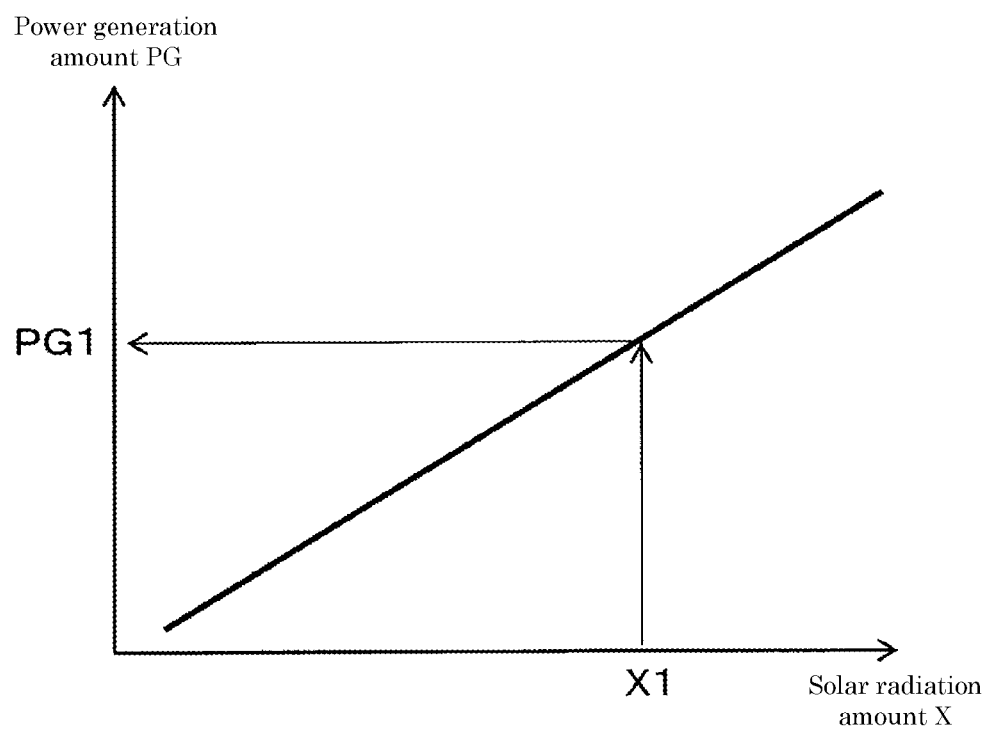
FIG. 3 illustrates a correlation characteristic between a solar radiation amount and a power generation amount.

The control device 50 obtains the prediction data of the power generation amount PG of the photovoltaic panel 10 and stores the prediction data into the memory 53. The prediction data of the power generation amount PG can be obtained from a prediction data provider 70 via the network NW. The prediction data provider 70 may be a provider by a supplier of the power conditioner 20 or a provider of the power company. The predicted value of the power generation amount PG of the photovoltaic panel 10 can be obtained from a predicted value of a solar radiation amount X. For example, when the predicted value of the solar radiation amount X is X1, the power generation amount can be predicted to be PG1 from the correlation characteristic of X-PG (see FIG. 3). The predicted value of the solar radiation amount X may be obtained from weather information.

The control device 50 predicts power consumption PL of the on-premise load L and stores the power consumption PL into the memory 53. The power consumption PL of the on-premise load L can be predicted from past data. For example, the data of the power consumption PL for the next day can be predicted by statistically processing the data of the power consumption PL for several days.

The power consumption PL of the on-premise load L can be obtained from the received power Pgrid at the power reception point 3 and the output power Pinv of the bidirectional inverter circuit 31. In the case of the forward current (Pgrid>0), the power consumption PL of the on-premise load L is the sum of the output power Pinv and the received power Pgrid. In the case of the reverse flow (Pgrid<0), the power consumption PL of the on-premise load L is a difference between the output power Pinv and the received power Pgrid.

$$PL = P\text{inv} + P\text{grid} \tag{1}$$

$$PL = P\text{inv} - P\text{grid} \tag{2}$$

3. Target Value Control System for Received Power Pgrid Based on Prediction of Power Supply and Demand The control device 50 predicts a supply and demand balance of power in units of several hours from the power generation amount prediction of the photovoltaic panel 10 and the power consumption prediction of the on-premise load L and performs the target value control of the received power Pgrid.

Figure 4:
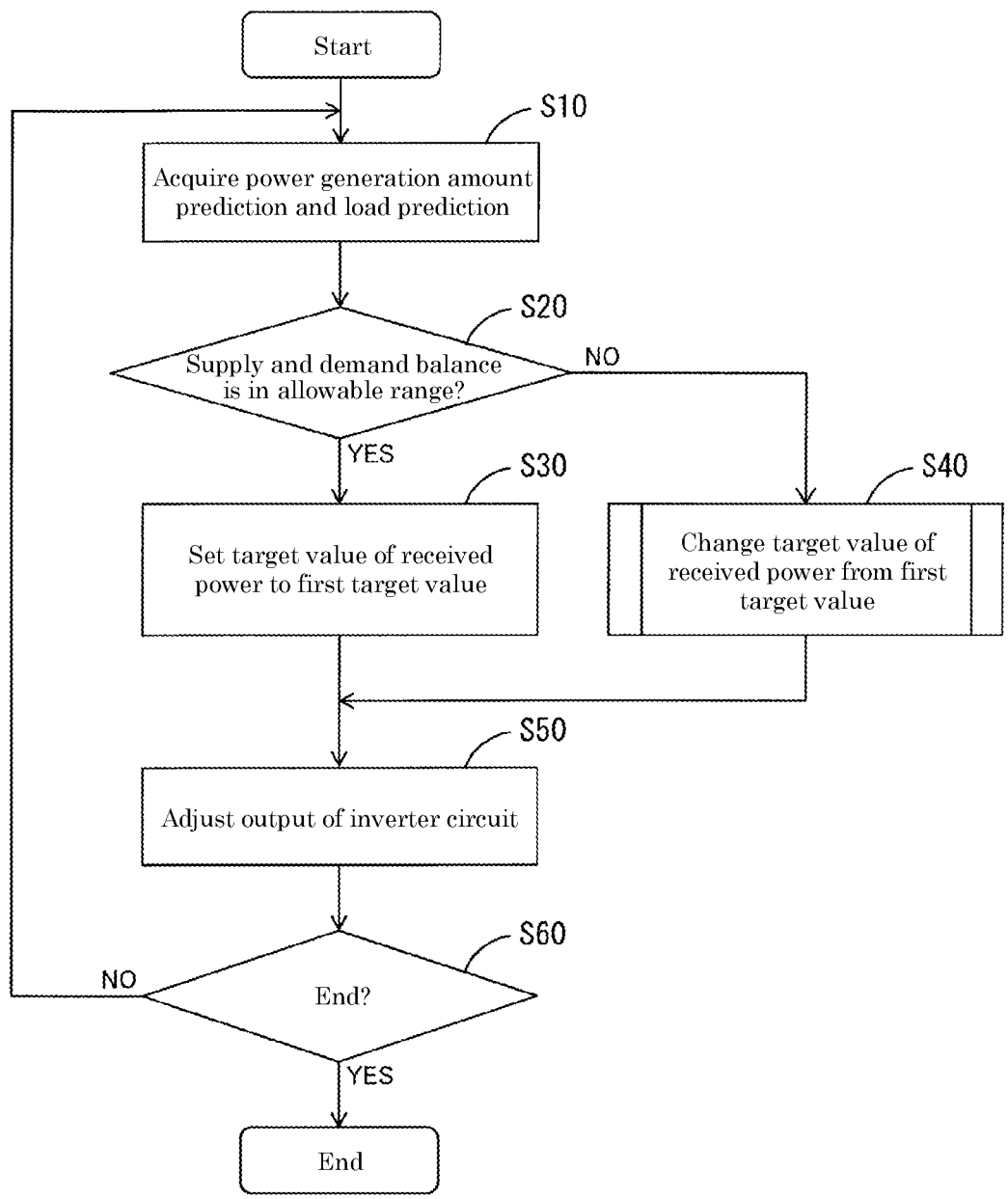
FIG. 4 is a flowchart of target value control of received power.

FIG. 4 is a flowchart of the target value control of the received power Pgrid. The target value control of the received power Pgrid is performed for a power-generatable period of the photovoltaic panel 10, that is, a period from sunrise to sunset.

When the target value control is started, the control device 50 reads the power generation amount prediction of the photovoltaic panel 10 and the power consumption prediction of the on-premise load L from the memory 53 (S10).

The control device 50 obtains a supply and demand balance of power from the power generation amount prediction and the power consumption prediction and determines whether the supply and demand balance is in an allowable range (S20). As shown in Formula (3), when an absolute value of a difference PL-PG between the power consumption PL of the on-premise load L and the power generation amount PG of the photovoltaic panel 10 is smaller than an allowable value K, the supply and demand balance of power can be determined to be in the allowable range.

$$|PL-PG|<K \qquad (3)$$

When the supply and demand balance of power is in the allowable range, and the energy storage apparatus 15 is discharging (S20: YES), the control device 50 sets the target value of the received power Pgrid at the power reception point 3 to the first target value (S30). A first target value is a positive value, for example, 500 W.

Next, the control device 50 adjusts the output of the bidirectional inverter circuit 31 (S50). In this case, the control device 50 performs control such that the received power Pgrid at the power reception point 3 does not fall below the first target value. That is, when the measured value of the received power Pgrid is lower than the first target value (500 W), the output power Pinv of the bidirectional inverter circuit 31 is lowered by reducing the discharge of the energy storage apparatus 15 to prevent the measured value of the received power Pgrid from falling below the first target value. It is thereby possible to prevent the power discharged from the energy storage apparatus 15 from flowing back to the power system 1.

When the energy storage apparatus 15 is not discharging, the control device 50 may convert the power generated by the solar cell panel 10 to AC by the bidirectional inverter circuit 31 and output the AC without performing the adjustment of the output power Pinv based on the first target value.

Thereafter, in S60, it is determined whether or not to end the target value control of the received power Pgrid. When that point in time is within the power-generatable period of the photovoltaic panel 10, the processing returns to S10, and the power generation amount prediction and the power consumption prediction for the next several hours are read from the memory 53.

When the supply and demand balance of power is in the allowable range, the above control is continued. Then, when the power generation of the photovoltaic panel 10 is stopped due to the sunset, YES is determined in S60, and the series of processing ends.

The power generation amount PG of the photovoltaic panel 10 is substantially proportional to solar radiation and thus varies depending on the weather. The power consumption PL of the on-premise load L also varies depending on the season and the day of the week. Therefore, the demand balance of power may be lost and deviate from the allowable range.

When the absolute value of the difference PL-PG between the power consumption PL of the on-premise load L and the power generation amount PG of the photovoltaic panel 10 is equal to or larger than the allowable value K, it can be determined that the supply and demand balance of power is out of the allowable range.

When the supply and demand balance of power is out of the allowable range (S20: NO), the control device 50 changes the target value of the received power Pgrid on the basis of the magnitude relationship between the predicted value of the power generation amount PG of the photovoltaic panel 10 and the predicted value of the power consumption PL of the on-premise load L (S40).

Figure 5:
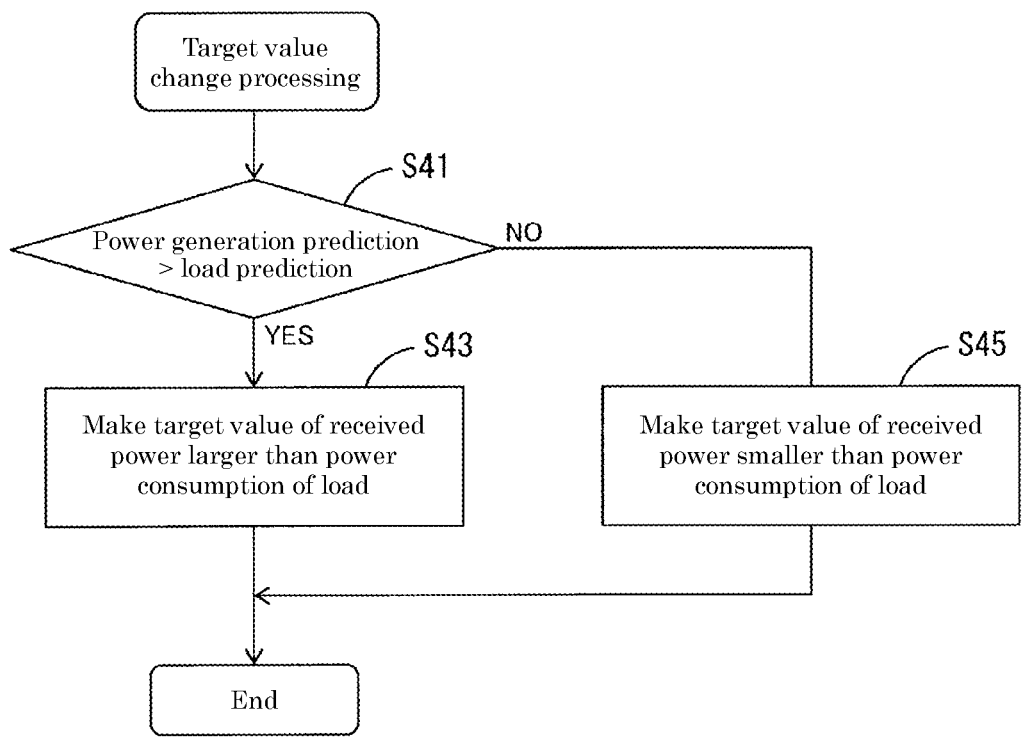
FIG. 5 is a flowchart of target value change processing.

FIG. 5 is a flowchart of target value change processing. The target value change processing includes three steps of S41, S43, and S45. In S41, the control device 50 determines the magnitude relationship between the power generation prediction and the load prediction of the on-premise load.

(Case of Excessive Supply of Electricity)

Figure 6:
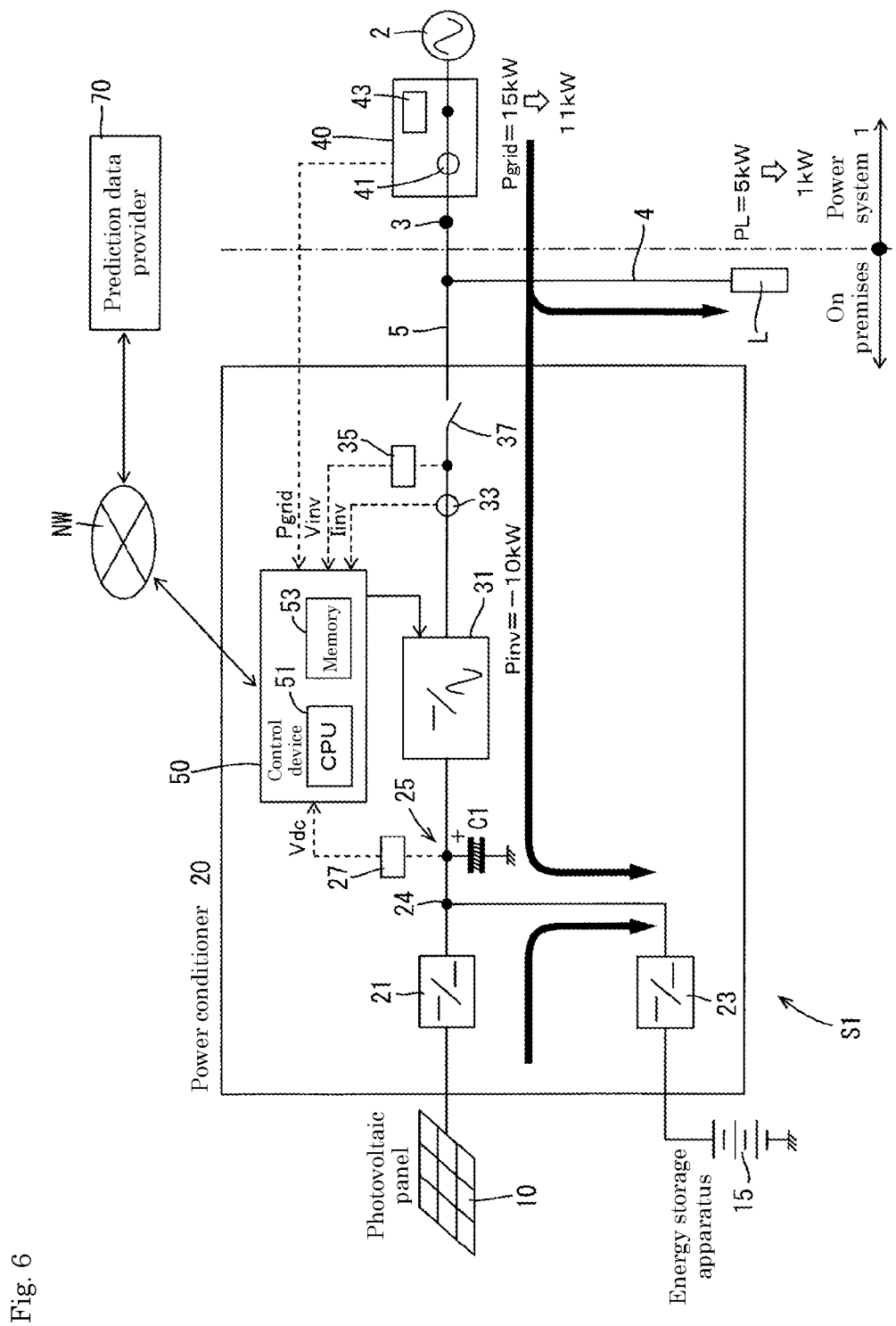
FIG. 6 is a diagram illustrating a power flow at the time of excessive supply.

When the predicted value of the power generation amount PG of the photovoltaic panel 10 is larger than the predicted value of the power consumption PL of the on-premise load L (S41: YES), the control device 50 sets the target value of the received power Pgrid to a value larger than the predicted value of the power consumption PL of the on-premise load L. By setting the target value of the received power Pgrid to a value larger than the predicted value of the power consumption PL of the on-premise load L, the bidirectional inverter circuit 31 performs the forward conversion operation. For example, as illustrated in FIG. 6, when the predicted value of the power consumption PL of the on-premise load L is 5 kW and the maximum output of the power conditioner 20 is 10 kW, the control device 50 sets the target value of the received power Pgrid to 15 kW. 15 kW is a value obtained by adding 10 kW, which is the maximum output of the power conditioner 20, to 5 kW, which is the predicted value of the power consumption PL.

The control device 50 adjusts the output power Pinv of the bidirectional inverter circuit 31 such that the measured value of the received power Pgrid matches the changed target value (S50). In this case, the output power Pinv of the bidirectional inverter circuit 31 is adjusted to −10 kW as illustrated in FIG. 6. That is, the bidirectional inverter circuit 31 performs the forward conversion operation of converting AC power input from the power system 1 to DC power and outputting the DC power to the energy storage apparatus 15, and the energy storage apparatus 15 can be charged with the power generated by the solar cell panel 10 and the power generated by the distributed power supply outside the premises connected to the power system 1. The distributed power supply outside the premises is a power supply using new energy, such as a solar cell panel, and is not illustrated.

Thereafter, in S60, it is determined whether or not to end the target value control of the received power Pgrid. When that point in time is within the power-generatable period of the photovoltaic panel 10, the processing returns to S10, and the power generation amount prediction and the power consumption prediction are newly acquired.

When a state continues where the power generation amount PG of the photovoltaic panel 10 is larger than the power consumption PL of the on-premise load L and the supply and demand balance of power is out of the allowable range, the target value of the received power Pgrid is maintained at the changed target value. Hence a state continues where the energy storage apparatus 15 is charged with the output of the photovoltaic panel 10 and the maximum output of the power conditioner 20 of 10 kW.

When the predicted value of the power consumption PL of the on-premise load L increases or decreases from the initial predicted value while the state where the supply and demand balance of power is outside the allowable range is continued, the target value of the received power Pgrid may be further changed from the changed target value. For example, when the predicted value of the power consumption PL decreases from 5 kW to 1 kW, the target value of the received power Pgrid may be changed from 15 kW to 11 kW.

11 kW is a value obtained by adding 10 kW, which is the maximum output of the power conditioner 20, to 1 kW, which is the predicted value after the increase or decrease of the power consumption PL. By changing the target value of the received power Pgrid in accordance with the load variation of the on-premise load L, it is possible to constantly charge the energy storage apparatus 15 with the maximum output of the power conditioner 20 in addition to the output of the photovoltaic panel 10.

When the power generation amount PG of the photovoltaic panel 10 is larger than the power consumption PL of the on-premise load L, the supply of electricity is excessive, and the frequency of the system voltage of the power system 1 tends to increase. When the supply of electricity is excessive, the energy storage apparatus 15 is charged and used as an on-premise load, so that the demand for electricity can be increased to prevent an increase in the frequency of the power system 1.

(Case of Excessive Demand for Electricity)

Figure 7:
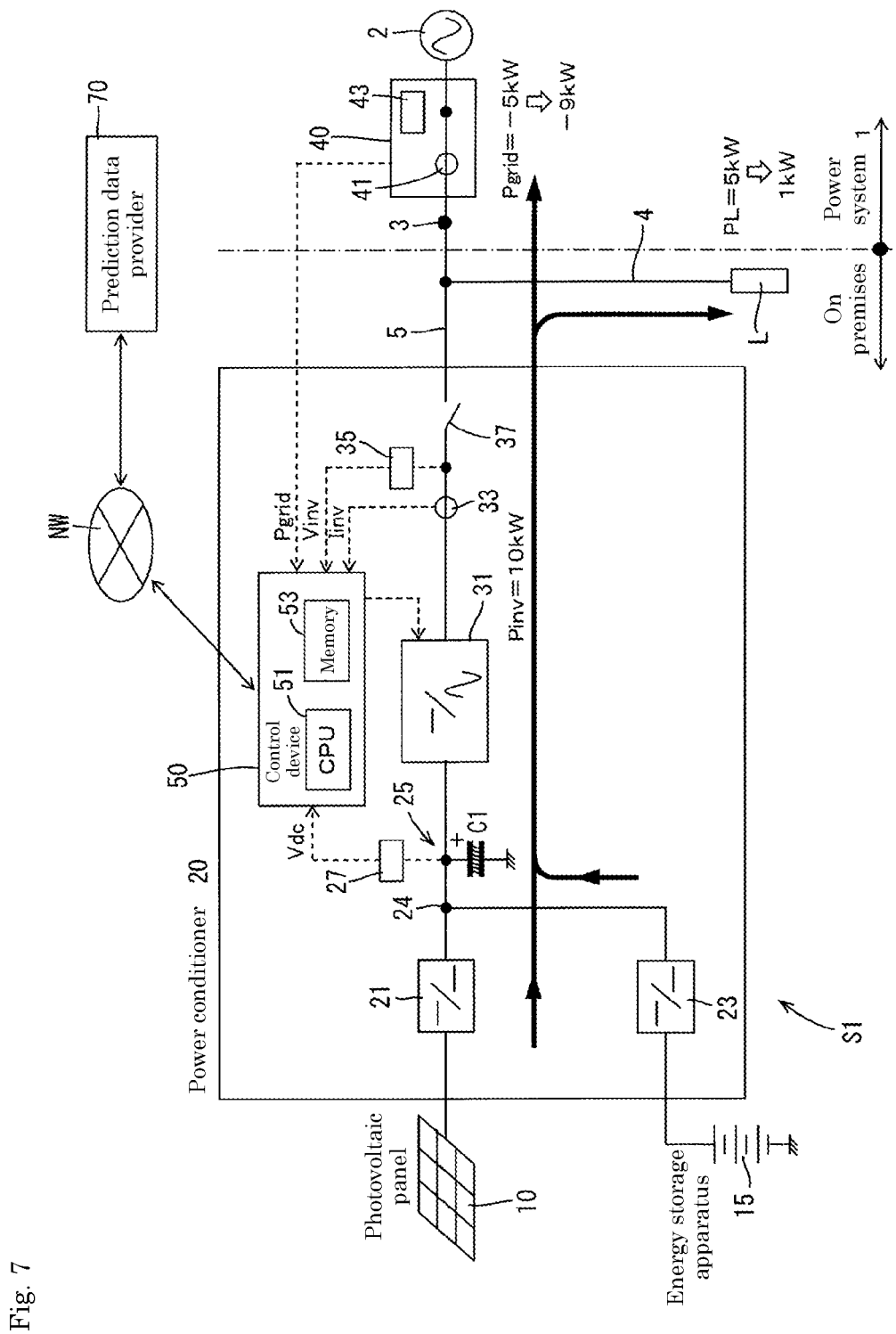
FIG. 7 is a diagram illustrating a power flow at the time of excessive demand.

When the predicted value of the power consumption PL of the on-premise load L is larger than the predicted value of the power generation amount PG of the photovoltaic panel 10 (S41: NO), the control device 50 sets the target value of the received power Pgrid to a value smaller than the predicted value of the power consumption PL of the on-premise load L. By setting the target value of the received power Pgrid to a value smaller than the predicted value of the power consumption PL of the on-premise load L, the bidirectional inverter circuit 31 performs the reverse conversion operation. The target value of the received power Pgrid may be plus (forward flow) or minus (reverse flow) so long as the target value is smaller than the predicted value of the power consumption PL of the on-premise load L. For example, as illustrated in FIG. 7, when the predicted value of the power consumption PL of the on-premise load L is 5 kW and the maximum output of the power conditioner 20 is 10 kW, the control device 50 sets the target value of the received power Pgrid to −5 kW. −5 kW is a value obtained by subtracting 10 kW, which is the maximum output of the power conditioner 20, from 5 kW, which is the predicted value of the power consumption PL.

The control device 50 adjusts the bidirectional inverter circuit 31 such that the measured value of the received power Pgrid matches the changed target value (S50). In this case, the output power Pinv of the bidirectional inverter circuit 31 is adjusted to 10 kW by the control device 50. The output power Pinv may be adjusted by adjusting the discharge amount of the energy storage apparatus 15 via the second converter circuit 23. As shown in FIG. 7, the bidirectional inverter circuit 31 performs the reverse conversion operation of converting DC power input from the solar cell panel 10 and the energy storage apparatus 15 to AC and outputting the AC power, and power corresponding to a difference between the output of 10 kW of the power conditioner 20 and the power consumption of 5 kW of the on-premise load L flows reversely from the power conditioner 20 to the power system 1.

Thereafter, in S60, it is determined whether or not to end the target value control of the received power Pgrid. When the photovoltaic panel 10 is performing power generation, the processing returns to S10, and the power generation amount prediction and the power consumption prediction are newly acquired.

When a state continues where the power consumption PL of the on-premise load L is larger than the power generation amount PG of the photovoltaic panel 10 and the supply and demand balance of power is out of the allowable range, the target value of the received power Pgrid is maintained at the changed target value. Hence a state continues where the energy storage apparatus 15 is discharged at the maximum output of 10 kW of the power conditioner 20, and power reversely flows from the power conditioner 20 to the power system 1.

When the predicted value of the power consumption PL of the on-premise load L increases or decreases from the initial predicted value while the state where the supply and demand balance of power is outside the allowable range is continued, the target value of the received power Pgrid may be further changed from the changed target value. For example, when the predicted value of the power consumption PL decreases from 5 kW to 1 kW, the target value of the received power Pgrid may be changed from −5 kW to −9 kW.

−9 kW is a value obtained by subtracting 10 kW, which is the maximum output of the power conditioner 20, from 1 kW, which is the predicted value after the increase or decrease of the power consumption PL. By changing the target value of the received power Pgrid in accordance with the load variation of the on-premise load L, the energy storage apparatus 15 can be constantly discharged at the maximum output of the power conditioner 20.

When the power consumption PL of the on-premise load L is larger than the power generation amount PG of the photovoltaic panel 10, the demand for electricity is excessive, and the frequency of the system voltage of the power system 1 tends to decrease. When the demand for electricity is excessive, the energy storage apparatus 15 charged so far with the surplus power of the photovoltaic panel 10 is discharged and used as a power supply, so that the supply of electricity can be increased to prevent a decrease in the frequency of the power system 1.

4. Effect

In the present embodiment, the power conditioner 20 predicts the supply and demand balance of electricity and performs demand adjustment (demand response) of electricity. It is thereby possible to realize the EMS technology without using a dedicated EMS controller.

The present technique is suitable for realizing a relatively small-scale smart city in land, such as a remote island, where the introduction of a distributed power supply system is desired due to high transportation cost of fossil fuel, effective use of renewable energy, or the like. In such land, there are few obstacles like high-rise buildings that block sunlight, and the power generation amount PG of the photovoltaic panel 10 tends to be easily predicted.

Second Embodiment

Figure 8:
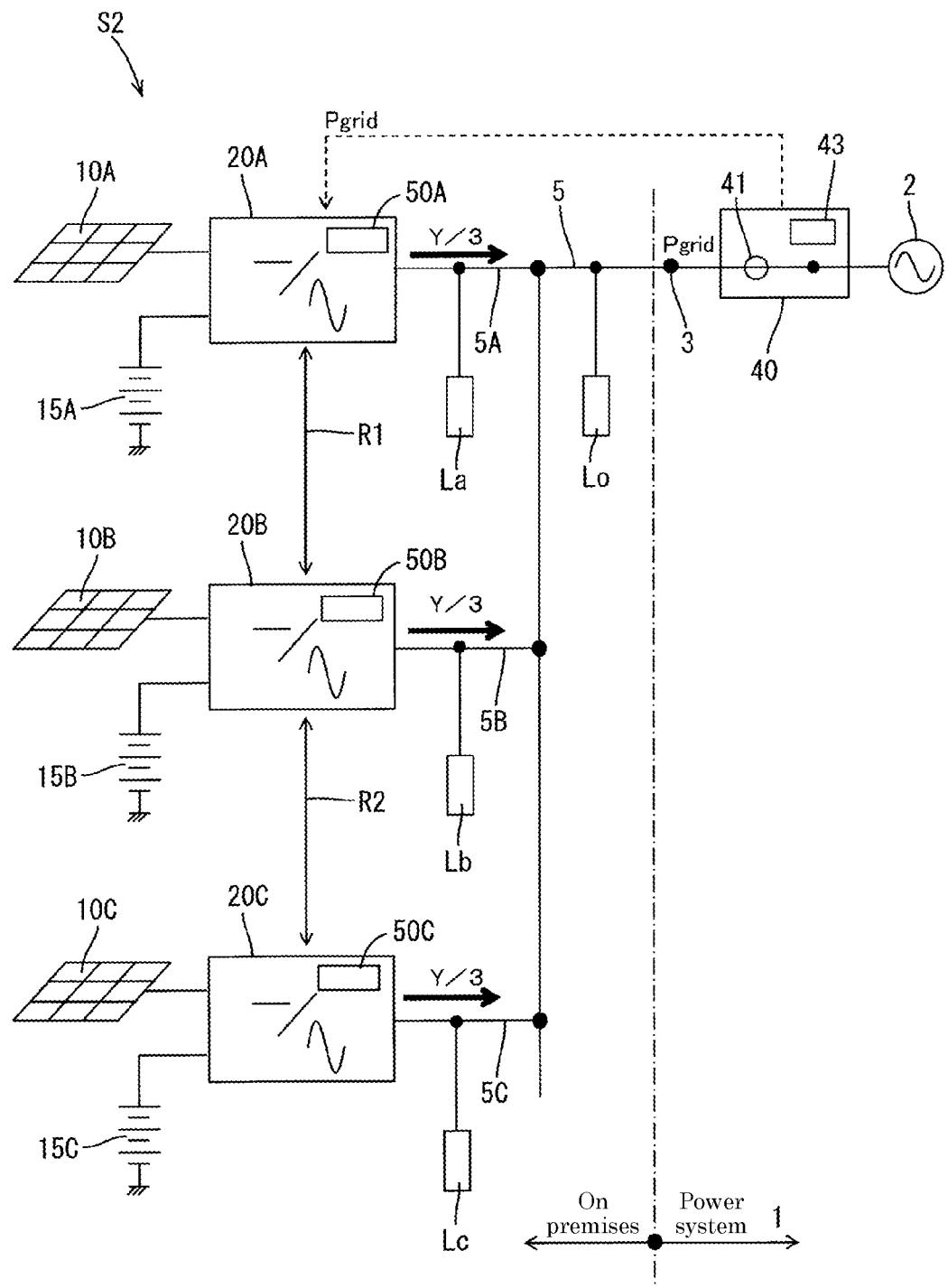
FIG. 8 is a block diagram of a photovoltaic system.

FIG. 8 is a block diagram of a photovoltaic system S2. The photovoltaic system S2 includes three power conditioners 20A, 20B, 20C.

The three power conditioners 20A, 20B, 20C are connected to a power line 5 via branch lines 5A, 5B, 5C. Three power conditioners 20A, 20B, 20C are connected in parallel to a power system 1.

The power conditioner 20A includes a control device 50A. A photovoltaic panel 10A and an energy storage apparatus 15A are connected in parallel to a power conditioner 20A.

The power conditioner 20B includes a control device 50B. A photovoltaic panel 10B and an energy storage apparatus 15B are connected in parallel to a power conditioner 20B. The power conditioner 20B is connected to the power conditioner 20A via a communication line R1 and can communicate with the power conditioner 20A.

The power conditioner 20C includes a control device 50C. A photovoltaic panel 10C and an energy storage apparatus 15C are connected in parallel to a power conditioner 20C. The power conditioner 20C is connected to the power conditioner 20B via a communication line R2 and can communicate with the power conditioner 20A via the power conditioner 20B.

Power conditioner 20A has a control function different from those of the power conditioners 20B and the power conditioner 20C, and the power conditioner 20A is a master device that integrally controls the output power of the three power conditioners 20A, 20B, 20C. The power conditioner 20B and the power conditioner 20C are slave devices that adjust output power in accordance with a command from power conditioner 20A.

A first on-premise load Lo, a second on-premise load La, a third on-premise load Lb, and a fourth on-premise load Lc are provided in the premises. The first on-premise load Lo is connected to the power line 5. The second on-premise load La, the third on-premise load Lb, and the fourth on-premise load Lc are connected to the branch lines 5A, 5B, 5C, respectively.

The power system 1 is provided with an external measuring instrument 40 as a meter for detecting power at a power reception point 3. The external measuring instrument 40 includes a received current detector 41 and a system voltage detector 43. The received current detector 41 detects a received current Igrid at the power reception point 3. The system voltage detector 43 detects a system voltage Vgrid of the power system 1.

The external measuring instrument 40 calculates received power (active power) Pgrid on the basis of the received current Igrid and the system voltage Vgrid. A received power Pgrid detected by the external measuring instrument 40 is input to the control device 50A of the power conditioner 20A.

The power conditioner 20A obtains a supply and demand balance of electricity from the power generation prediction of the photovoltaic panels 10A, 10B, 10C and the load prediction of the on-premise loads Lo, La, Lb, Lc and calculates a target value of the received power Pgrid at the power reception point 3 in accordance with the supply and demand balance of electricity.

The power conditioner 20A integrally controls the output power of the three power conditioners 20A, 20B, 20C connected in parallel such that the received power Pgrid at the power reception point 3 matches the target value. That is, when the received power Pgrid at the power reception point 3 does not match the target value, the power conditioner 20A determines the shares of the adjustment amount and sends a command to each of the power conditioner 20B and the power conditioner 20C. Then, by adjusting the output power by each of the power conditioners 20A, 20B, 20C, the received power Pgrid at the power reception point 3 can be caused to follow the target value.

For example, when the received power Pgrid at the power reception point 3 is more than the target value by "Y", the power conditioner 20A transmits a command to each of the power conditioner 20B and the power conditioner 20C to increase the output power of each of the three power conditioners 20A to 20C from the current value by "Y/3".

By increasing the output power of each of the three power conditioners 20A, 20B, 20C by "Y/3", the total output power of the power conditioners 20A, 20B, 20C increases by "Y". As a result, the received power Pgrid at the power reception point 3 can be decreased by "Y" to be matched with the target value.

The sharing ratio of the power conditioners 20A, 20B, 20C may be determined in accordance with the state of charge (SOC) of the energy storage apparatus 15.

Figure 9:
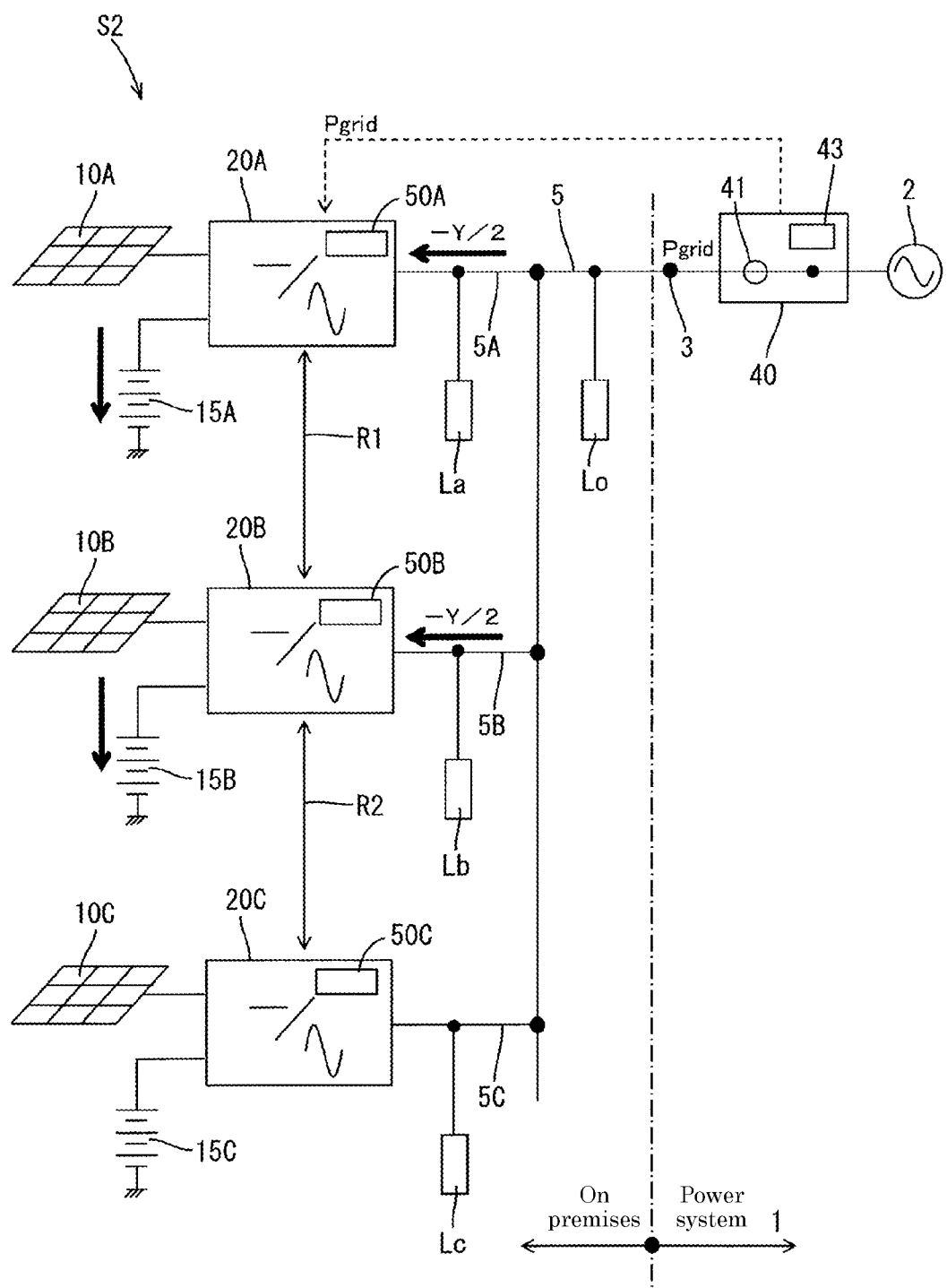
FIG. 9 is a block diagram of a photovoltaic system.

For example, in a case where the SOC of the energy storage apparatus 15C is higher than the SOC of each of the energy storage apparatus 15A and the energy storage apparatus 15B when the demand for electricity is to be increased by charging the energy storage apparatus, as shown in FIG. 9, the output power of each of the power conditioner 20A and the power conditioner 20B may be set to "−Y/2", and only the two energy storage apparatuses 15A, 15B with low SOC may be charged. In this way, the two energy storage apparatuses 15A, 15B each having a low SOC are charged, so that the difference in SOC among the energy storage apparatuses 15A, 15B, 15C can be prevented, and the three energy storage apparatuses 15A, 15B, 15C can be used uniformly. This is effective to the long life of the photovoltaic system S2.

Figure 10:
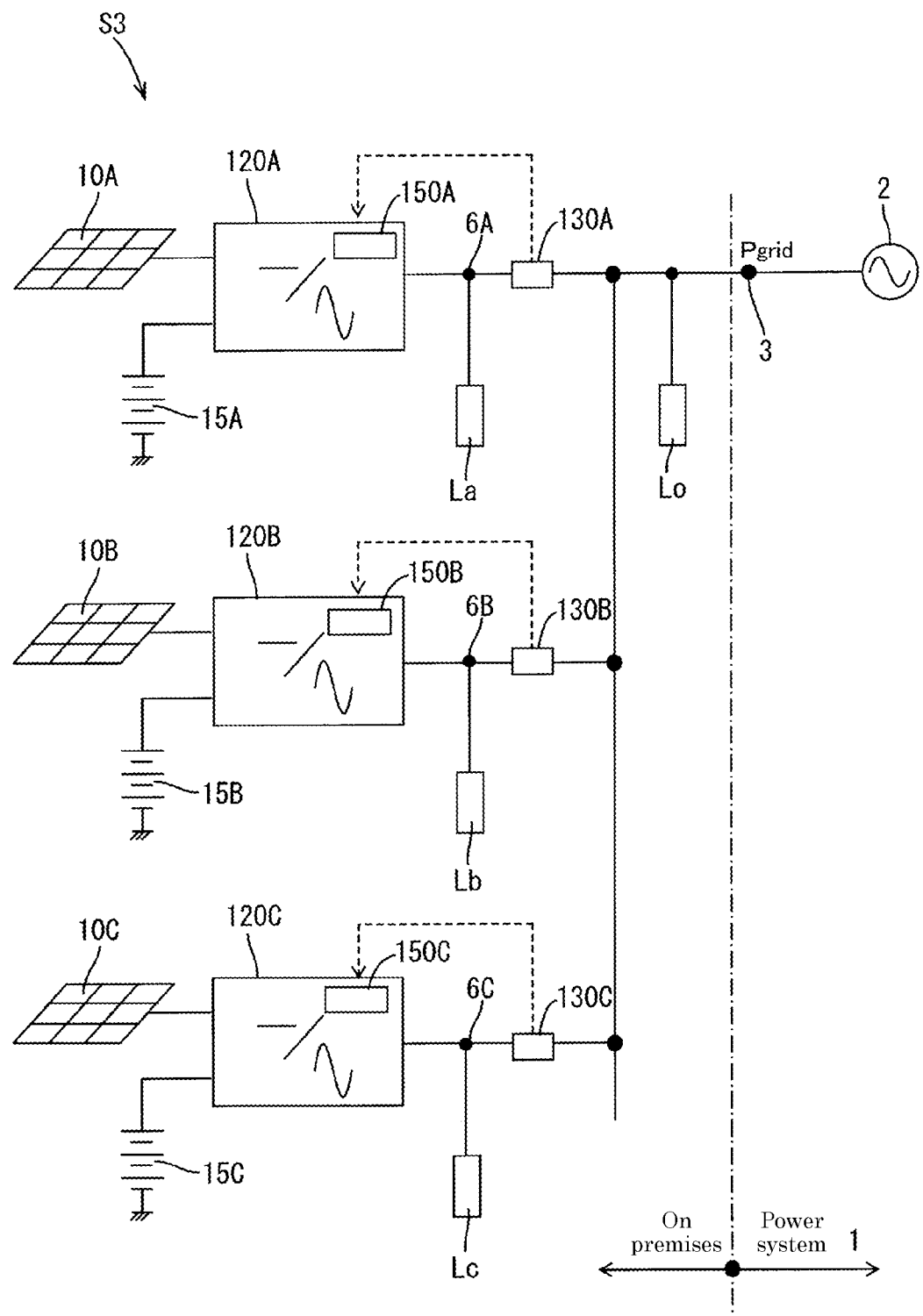
FIG. 10 is a comparative example of a photovoltaic system.

FIG. 10 is a comparative example of the photovoltaic system. A system S3 in FIG. 10 includes three power conditioners 120A, 120B, 120C connected in parallel. The three power conditioners 120A, 120B, 120C are branched and connected to the power line 5 via the branch lines 5A, 5B, 5C, and are connected in parallel.

The branch lines 5A, 5B, 5C are provided with power meters 130A, 130B, 130C, respectively. The power meters 130A, 130B, 130C measure received power at on-premise load points 6A, 6B, 6C.

A control unit 150A of the power conditioner 120A monitors the measured value of the power meter 130A and controls the output power such that the received power at the on-premise load point 6A becomes a target value.

A control unit 150B of the power conditioner 120B monitors the measured value of the power meter 130B and controls the output power such that the received power at the on-premise load point 6B becomes a target value. Similarly, a control unit 150C of the power conditioner 120C monitors the measured value of the power meter 130C and controls the output power such that the received power at the on-premise load point 6C becomes a target value.

The received power Pgrid at the power reception point 3 is a sum of the received power at the on-premise load point 6A, the received power at the on-premise load point 6B, and the received power at the on-premise load point 6C. Thus, the power conditioners 120A, 120B, 120C independently control the output such that the received power at each of the on-premise load points 6A, 6B, 6C becomes the target value, whereby the received power Pgrid at the power reception point 3 can be controlled to the target value.

When the power conditioners 120A, 120B, 120C independently control the output, there is a concern that the output adjustment performed by a certain power conditioner affects the output of another power conditioner, and as a result, the hunting of the command value occurs to make the power flow at the power reception point 3 unstable.

In the photovoltaic system S2 shown in FIG. 9, the power conditioner 20A integrally controls the output power of each of the three power conditioners 20A, 20B, 20C. Hence the hunting of the command value can be prevented to stabilize the power flow at the power reception point 3.

Other Embodiments

The present invention is not limited to the embodiments explained by the above description and drawings, and for example, the following embodiments are also included in the technical scope of the present invention.

(1) In the first and second embodiments, the distributed power supply has been the photovoltaic panel 10. The distributed power supply is a generic term for all small-scale power generation facilities dispersedly disposed adjacent to the demand site and may be, for example, a wind power generator or a biomass power generator in addition to the photovoltaic panel 10. In the case of an AC power generator such as the wind power generator or the biomass power generator, the output of the power generator may be rectified by a rectifier to be converted to a DC, and the power generator is then connected to the DC link 25 via a converter circuit.

(2) In the first and second embodiments, in the case of excessive supply of electricity (FIG. 6), the energy storage apparatus 15 has been charged to increase the demand for electricity. In the case of excessive demand for electricity (FIG. 7), the energy storage apparatus 15 has been discharged to increase the amount of electricity supplied. Only one of these adjustments may be performed. That is, only adjustment to increase the demand for electricity may be performed in the case of excessive supply of electricity, or only adjustment to increase the supply of electricity may be performed in the case of excessive demand for electricity. The adjustment of the supply amount of electricity is not limited to the adjustment of the discharge amount of the energy storage apparatus 15 but may be performed using the power factor of the bidirectional inverter circuit 31.

(3) In the first and second embodiments, in the case of excessive supply of electricity (in the case of FIG. 6), the energy storage apparatus 15 has been charged with the power generated by the solar cell panel 10 and the power from the distributed power supply outside the premises connected to the power system 1. The energy storage apparatus 15 may be charged only with the power generated by the solar cell panel 10 or may be charged only with the power from the distributed power supply outside the premises connected to the power system 1. In a case where the energy storage apparatus 15 is charged only with the power generated by the solar cell panel 10, the bidirectional inverter circuit 31 may be stopped, or the relay 37 may be opened to disconnect the power conditioner 20 from the power system 1. The target value of the received power Pgrid may be made equal to the power consumption PL of the on-premise load L, and power may be supplied from the power system 1 to the on-premise load L.

(4) In the first and second embodiments, the conversion circuit has been the bidirectional inverter circuit 31. The conversion circuit only may only perform reverse conversion of converting power supplied from the distributed power supply from DC to AC and outputting the converted power and may not be bidirectional. The distributed power supply may not necessarily include the energy storage apparatus 15.

(5) In the first and second embodiments, the control device 50 has obtained the prediction data of the power generation amount PG from the prediction data provider 70 via the network NW. The power generation amount PG may be predicted by the control device 50.

(6) In the first and second embodiments, the control device 50 has adjusted the supply and demand for electricity when the supply and demand balance of power is out of the allowable range. Specifically, in the case of PG>PL, the control (S43) has been performed to increase the demand for electricity by making the target value of the received power Pgrid larger than the predicted value of the power consumption PL of the on-premise load L. In the case of PL>PG, the control (S45) has been performed to increase the supply of electricity by making the target value of the received power Pgrid smaller than the predicted value of the power consumption PL of the on-premise load L.

The control to increase the demand for electricity (S43) may be performed at any time so long as the condition of PG>PL is satisfied, or may be performed when the supply and demand balance of power is in the allowable range. The control to increase the supply of electricity (S45) may be performed at any time so long as the condition of PL>PG is satisfied, or may be performed when the supply and demand balance of power is in the allowable range. It is sufficient when the demand for electricity increases (the supply of electricity decreases) in the case of PG>PL and the supply of electricity increases (the demand for electricity decreases) in the case of PL>PG, and the target values of the received power Pgrid may be Pgrid1>0 and Pgrid2<0. Pgrid1 is a target value of the received power Pgrid in the case of PG>PL, and Pgrid2 is a target value of the received power Pgrid in the case of PL>PG. Further, a condition of Pgrid1>Pgrid2 may be satisfied.

(7) In the first and second embodiments, in the case of excessive demand for electricity (in the case of FIG. 7), the energy storage apparatus 15 has been discharged in order to set Pgrid2 to −5 kW. When the received power can be controlled to Pgrid2 without discharging the energy storage apparatus 15 (e.g., when Pgrid2>0), the energy storage apparatus 15 may not be discharged.

DESCRIPTION OF REFERENCE SIGNS

1: power system
2: system power supply
3: power reception point
10: photovoltaic panel (example of "distributed power supply" of
present invention)
15: energy storage apparatus
20: Power conditioner (example of "power control apparatus" of
present invention)
21: first converter circuit
23: second converter circuit
31: inverter circuit
40: external measuring instrument
50: control device
120A: master device
120B: slave device
120C: slave device

The invention claimed is:

1. A power control apparatus for a distributed power supply interconnected with a power system, the power control apparatus comprising:
a conversion circuit that performs reverse conversion of converting power supplied from the distributed power supply from direct current (DC) to alternating current (AC) and outputting the converted power; and
a control device that controls the conversion circuit,
wherein the control device
changes a target value of received power at a power reception point of the power system on a basis of a predicted value of a power generation amount of the distributed power supply and a predicted value of power consumption of a demand facility, the power reception point being located outside a premise in which the power control apparatus and the demand facility are connected to a power line, and controls an output of the conversion circuit such that the received power at the power reception point becomes the target value.

2. A power control apparatus for a distributed power supply interconnected with a power system, the power control apparatus comprising:
a conversion circuit that performs reverse conversion of converting power supplied from the distributed power supply from direct current (DC) to alternating current (AC) and outputting the converted power; and
a control device that controls the conversion circuit, wherein the control device
changes a target value of received power at a power reception point of the power system on a basis of a predicted value of a power generation amount of the distributed power supply and a predicted value of power consumption of a demand facility, and
controls an output of the conversion circuit such that the received power at the power reception point becomes the target value,
the conversion circuit is a bidirectional conversion circuit that selectively performs reverse conversion of converting power supplied from the distributed power supply from DC to AC and outputting the converted power or forward conversion of converting power supplied from the power system from AC to DC and outputting the converted power,
to the conversion circuit, an energy storage apparatus is connected in parallel with the distributed power supply, and
the control device changes the target value of the received power to a value larger than the predicted value of the power consumption when the predicted value of the power generation amount of the distributed power supply is larger than the predicted value of the power consumption, the control device causing the conversion circuit to perform a forward conversion operation to charge the energy storage apparatus.

3. A power control apparatus for a distributed power supply interconnected with a power system, the power control apparatus comprising:
a conversion circuit that performs reverse conversion of converting power supplied from the distributed power supply from direct current (DC) to alternating current (AC) and outputting the converted power; and
a control device that controls the conversion circuit, wherein the control device
changes a target value of received power at a power reception point of the power system on a basis of a predicted value of a power generation amount of the distributed power supply and a predicted value of power consumption of a demand facility, and
controls an output of the conversion circuit such that the received power at the power reception point becomes the target value,
the conversion circuit is a bidirectional conversion circuit that selectively performs reverse conversion of converting power supplied from the distributed power supply from DC to AC and outputting the converted power or forward conversion of converting power supplied from the power system from AC to DC and outputting the converted power,
to the conversion circuit, an energy storage apparatus is connected in parallel with the distributed power supply, and the control device changes the target value of the received power to a value smaller than the predicted value of the power consumption when the predicted value of the power consumption is larger than the predicted value of the power generation amount of the distributed power supply, the control device causing the conversion circuit to perform a reverse conversion operation to discharge the energy storage apparatus.

4. A distributed power generating system interconnected with the power system, the distributed power generating system comprising:
the power control apparatus according to claim 1;
the distributed power supply connected to the power control apparatus; and
an energy storage apparatus connected to the power control apparatus.

5. A control method for a power control apparatus for a distributed power supply interconnected with a power system, the control method comprising:
changing a target value of received power at a power reception point of the power system on a basis of a predicted value of a power generation amount of the distributed power supply and a predicted value of power consumption of a demand facility connected to the power reception point of the power system, the power reception point being located outside a premise in which the power control apparatus and the demand facility are connected to a power line, and
controlling an output of a conversion circuit that performs reverse conversion of converting power supplied from the distributed power supply from DC to AC such that the received power at the power reception point becomes the target value.

6. A distributed power generating system comprising:
a plurality of power control apparatuses connected in parallel to a power system;
a plurality of distributed power supplies connected to the plurality of power control apparatuses, respectively; and
a plurality of energy storage apparatuses connected to the plurality of power control apparatuses, respectively,
wherein the plurality of power control apparatuses includes
a master device, and
a slave device communicably connected to the master device, and
the master device
changes a target value of received power at a power reception point of the power system on a basis of predicted values of power generation amounts of the distributed power supplies and predicted values of power consumption of demand facilities connected to the power reception point of the power system, the power reception point being located outside a premise in which the power control apparatuses and the demand facilities are connected to a power line, and
integrally controls output power of the master device and output power of the slave device such that the received power at the power reception point of the power system becomes the target value.

7. A distributed power generating system interconnected with the power system, the distributed power generating system comprising:
the power control apparatus according to claim 2;
the distributed power supply connected to the power control apparatus; and the energy storage apparatus connected to the power control apparatus.

8. A distributed power generating system interconnected with the power system, the distributed power generating system comprising:
- the power control apparatus according to claim 3;
- the distributed power supply connected to the power control apparatus; and
- the energy storage apparatus connected to the power control apparatus.

9. The distributed power generating system according to claim 4, wherein a dedicated energy management system (EMS) controller is not provided.

10. The distributed power generating system according to claim 7, wherein a dedicated energy management system (EMS) controller is not provided.

11. The distributed power generating system according to claim 8, wherein a dedicated energy management system (EMS) controller is not provided.

12. The power control apparatus according to claim 1, wherein the control device receives from an external measuring instrument the received power at the power reception point, which is calculated on a basis of received current and system voltage detected by the external measuring instrument.

13. The control method for the power control apparatus according to claim 5, further comprising receiving from an external measuring instrument the received power at the power reception point, which is calculated on a basis of received current and system voltage detected by the external measuring instrument.

14. The distributed power generating system according to claim 6, wherein the master device receives from an external measuring instrument the received power at the power reception point, which is calculated on a basis of received current and system voltage detected by the external measuring instrument.

15. The power control apparatus according to claim 1, wherein the control device changes the target value and controls the output of the conversion circuit in response to a demand response command.

16. The control method for the power control apparatus according to claim 5, wherein the changing and the controlling are performed in response to a demand response command.

17. The distributed power generating system according to claim 6, wherein the master device changes the target value and controls an output of a conversion circuit in response to a demand response command.

18. A computer-readable medium storing a program comprising the control method for the power control apparatus according to claim 5.

19. The power control apparatus according to claim 1, wherein the power reception point comprises a power supply point that is disposed outside the premise and in between the power system and the premise including the demand facility.

20. The power control apparatus according to claim 12, wherein the external measuring instrument is disposed outside the premise.

* * * * *